United States Patent
Tai et al.

(10) Patent No.: US 10,875,262 B2
(45) Date of Patent: Dec. 29, 2020

(54) TAPE LAYING AND CUTTING SYSTEM FOR FIBER REINFORCED PLASTIC MANUFACTURING

(71) Applicant: ADDCOMPOSITES OY, Espoo (FI)

(72) Inventors: Qiongge Tai, Espoo (FI); Pravin Luthada, Espoo (FI); Emir Goletic, Espoo (FI); Oriol Ala Puig, Helsinki (FI); Vaibhav Shah, Espoo (FI)

(*) Notice: Subject to any disclaimer, the term of this patent is extended or adjusted under 35 U.S.C. 154(b) by 0 days.

(21) Appl. No.: 16/092,028

(22) PCT Filed: Apr. 7, 2017

(86) PCT No.: PCT/FI2017/050251
§ 371 (c)(1),
(2) Date: Oct. 8, 2018

(87) PCT Pub. No.: WO2017/174881
PCT Pub. Date: Oct. 12, 2017

(65) Prior Publication Data
US 2019/0160761 A1     May 30, 2019

(30) Foreign Application Priority Data

Apr. 7, 2016  (FI) .................................... 20160087

(51) Int. Cl.
*B29C 70/38*      (2006.01)
*B29C 70/54*      (2006.01)
*B29B 15/12*      (2006.01)
*B29K 63/00*      (2006.01)

(52) U.S. Cl.
CPC .......... *B29C 70/388* (2013.01); *B29B 15/122* (2013.01); *B29C 70/545* (2013.01); *B29C 2793/0027* (2013.01); *B29K 2063/00* (2013.01)

(58) Field of Classification Search
CPC ................ B29C 70/388; B29C 70/545; B29C 2793/0027; B29B 15/122; B29K 2063/00
See application file for complete search history.

(56) References Cited

U.S. PATENT DOCUMENTS

| | | | |
|---|---|---|---|
| 4,591,402 A | 5/1986 | Evans et al. | |
| 7,326,312 B1 * | 2/2008 | Rust | B29C 70/388 |
| | | | 156/234 |

(Continued)

FOREIGN PATENT DOCUMENTS

| | | |
|---|---|---|
| EP | 0 881 026 | 12/1998 |
| EP | 2 345 530 | 7/2011 |

(Continued)

OTHER PUBLICATIONS

EP-2345530-A1 Machine Translation of Description (EPO/Google).*

(Continued)

*Primary Examiner* — Christopher T Schatz
*Assistant Examiner* — Cynthia L Schaller
(74) *Attorney, Agent, or Firm* — Mcdonnell Boehnen Hulbert & Berghoff LLP

(57) ABSTRACT

This patent application focuses on the cutting, laying and impregnating the fiber tape using a tape laying and cutting head. The head contains a stationary or moving laser system with an in-situ mixing of resin and hardener, rollers (1,2) and a spreader (6) for pressing. The head enables manufacturing of small fiber reinforced parts avoiding the problems in manufacturing them.

10 Claims, 2 Drawing Sheets

(56) References Cited

U.S. PATENT DOCUMENTS

| | | | |
|---|---|---|---|
| 9,908,993 B1* | 3/2018 | Barnell | B29C 70/36 |
| 2004/0226651 A1 | 11/2004 | Ledet et al. | |
| 2005/0209735 A1* | 9/2005 | Groppe | B29C 70/32 |
| | | | 700/245 |
| 2006/0289111 A1 | 12/2006 | Krogager et al. | |
| 2009/0229760 A1 | 9/2009 | Hamlyn et al. | |
| 2011/0005456 A1* | 1/2011 | Lizarralde Dorronsoro | ............... |
| | | | B29C 70/388 |
| | | | 118/33 |
| 2012/0325398 A1* | 12/2012 | Silcock | B29C 66/9241 |
| | | | 156/176 |
| 2015/0266284 A1* | 9/2015 | Oldani | B29C 70/38 |
| | | | 156/166 |
| 2015/0273736 A1 | 10/2015 | Schneider et al. | |

FOREIGN PATENT DOCUMENTS

| | | | | |
|---|---|---|---|---|
| EP | 2345530 A1 * | 7/2011 | ........... | B29C 70/386 |
| EP | 2433780 A1 | 3/2012 | | |
| ES | 2370666 B1 * | 1/2012 | | |
| WO | WO-199620062 | * | 7/1996 | |
| WO | 2007/045088 | | 4/2007 | |

OTHER PUBLICATIONS

ES-2370666-B1 Machine Translation of Description (EPO/Google).*

Finnish Patent Office Search Report for 20160087, dated Nov. 23, 2016.

The International Search Report with Written Opinion for PCT/FI2017/050251 dated Jun. 22, 2017, pp. 1-11.

* cited by examiner

TAPE LAYING AND CUTTING SYSTEM FOR FIBER REINFORCED PLASTIC MANUFACTURING

CROSS-REFERENCE TO RELATED APPLICATION

This application is a U.S. national phase of International Application No. PCT/FI2017/050251, filed Apr. 7, 2017, which claims priority to Finland Patent Application No. 20160087, filed Apr. 7, 2016, both of which are incorporated by reference herein in their entirety.

FIELD OF THE INVENTION

The invention concerns in general the technical field of material laying, machining and forming. More particularly, the invention concerns a laying device and a cutting device for fiber tapes.

BACKGROUND

Fiber reinforced plastic (FRP) parts are increasingly used in automotive and aerospace industries due to their lightweight and high strength [1-3]. However, due to their high cost and specialized manufacturing processes, they have mainly been restricted to aerospace and high-end automotive industries. The future of manufacturing for lightweight composite structures relies strongly on automation to bring down the overall cost of FRP parts [4, 5].

Manufacturing of these FRP parts is gradually becoming automated using 5-axis Automated Tape Laying (ATL) machines which are used for manufacturing big size parts. These ATL system employs a tape laying head for laying down the carbon fiber prepreg tapes. Prepregs are fibers which have been pre-impregnated with a resin system (typically epoxy). In the process of laying, after each pass of laying tape, the tape is cut using an ultrasonic blade. However, these cutting systems are bulky, require frequent maintenance and blade replacements after an average of about 6000 cuts [6].

SUMMARY OF THE INVENTION

In this patent application, a new invention for a compact tape laying system for feeding, positioning, and impregnating the tape, with a stationary or moving miniaturized cutting sub-system to cut the dry fiber tape is disclosed. The system is not limited to the width of the tape. The system has one or more rollers for guiding, feeding and laying the tape, a stationary or moving cutter, a resin impregnation and mixing system and a spreading and compacting system for uniform and thorough resin impregnation. The resin and hardener are mixed in-situ before impregnating the tape. The system is able to move in X-Y-Z axes (linear movements) and in A-B-C axes (rotating movements). Thus, fibers can be laid on a 3-dimensional surface over a mould of complex geometry. The system is able to trim every layer of the FRP to an almost-finished part, reducing post-processing. Repeating the process layer upon layer in a controlled layup sequence and with a chosen fiber direction for each layer, the desired parts are obtained.

BRIEF DESCRIPTION OF FIGURES

The embodiments of the invention are illustrated by way of example and not by way of limitation, the figures of accompanying drawings.

DETAILED DESCRIPTION

In this patent application, an embodiment of a tape laying system for feeding, positioning, impregnating and cutting a tape is presented. Also a method for manufacturing fiber reinforced plastic parts is presented.

Figure 1:
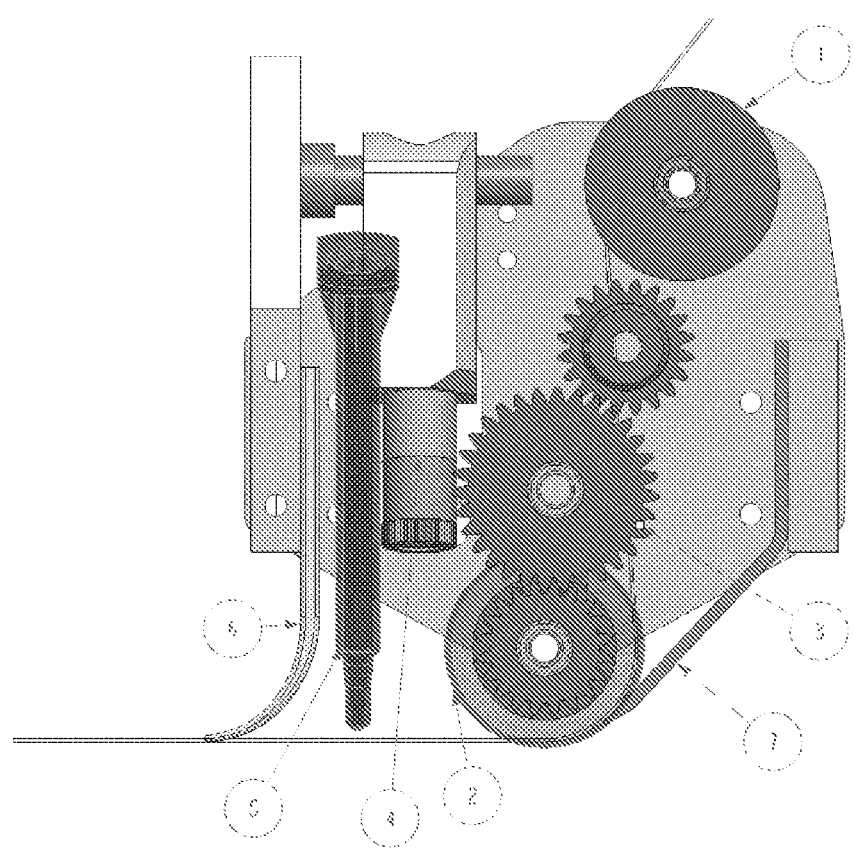
FIG. 1 illustrates the laser cutting and laying head.
Figure 2:
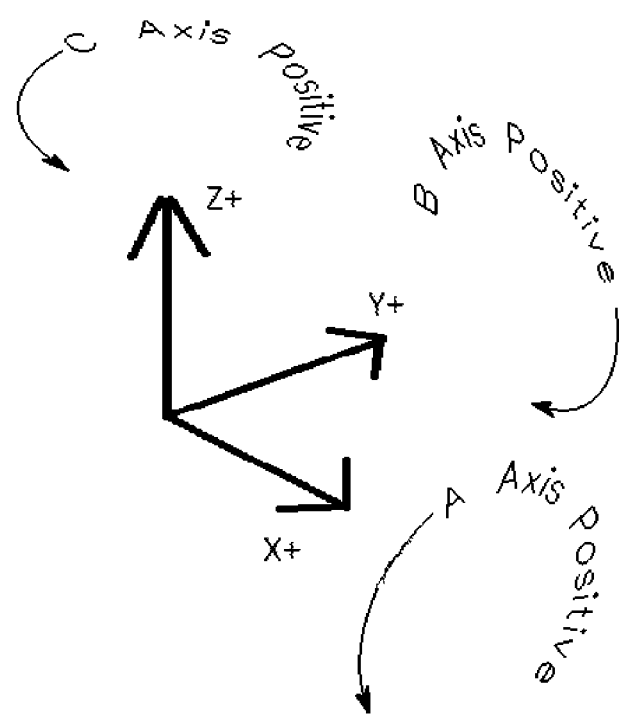
FIG. 2 illustrates the head moving directions.

The system of FIG. 1 comprises three major subsystems:
a. Tape rolling subsystem
b. Tape impregnation subsystem
c. Tape cutting subsystem

TABLE 1

The part No. and items in FIG. 1.

| Part No. | Item |
| --- | --- |
| 1 | Upper roller |
| 2 | Lower Roller |
| 3 | Gear train |
| 4 | Laser cutter |
| 5 | Resin mixer |
| 6 | Spreader |
| 7 | Tape pressing plate |

TABLE 2

The head moving directions.

| | |
| --- | --- |
| X axis | Fiber direction, and tape laying passes direction |
| Y axis | Perpendicular direction to fiber (tape width) |
| Z axis | Perpendicular direction to fiber and tape width |
| A, B and C | Rotation about X, Y and Z axis respectively |

In this system, a tape laying head moves in planar motion (XZ plane) while placing one segment of tape on the mould for every pass before cutting the tape and moving one tape width on Y direction. The planar motion in XZ plane is only an example which helps to understand the concept of this embodiment. The tape laying head of the system could also be moved in linear motion, in planar motion in any other plane or following a path defined in a three-dimensional space. The tape-laying head has a rolling system comprising one or more rollers. In an embodiment, the rolling system consists of two rollers, upper roller 1 and lower roller 2 to keep the tape in tension. The upper roller 1 is idler and lower roller 2 is rotated by rotating a motor connected to gear train 3 which in turn rotates the lower roller 2. The lower roller 2 follows the XZ profile of the part, with the total head movement in the X direction. The lower roller 2 is applying certain force towards the mould and can be rigid or elastic to ensure better placement of fibers on complex moulds. In an embodiment the upper roller 1 can be omitted and the tension can be controlled with other means, e.g. by controlling the feeding or releasing of the tape from a roll. Tape pressing plate 7 ensures consistent contact of the tape and the lower roller.

After laying a pass of tape, the tape is cut with a tape cutting sub-system and the tape-laying head is shifted one tape width to a direction perpendicular to the direction of the previously laid tape. In other words, the tape-laying head lays the tapes next to each other with each pass until a defined surface is covered with the tape. After that a second layer of tape can be laid on top of the first layer of tape.

Preferably, either the mould or the tape-laying head is rotated between successive layers to achieve crosswise direction of tapes between successive layers. The fiber orientation in each layer can be chosen by rotating the mould platform (rotates ±C direction) or the tape-laying head itself. The head can be used for laying up on mould with free form surfaces. Repeating the process and building layer by layer it forms desired layup sequence and the parts. The term tape refers in this patent application to a dry or lightly bounded spread fiber tow. Preferably a spread tow consisting of unidirectional fibers with or without a binder is used. The tape can also consist of unidirectional fibers with crimps. In an embodiment, the binder component constitutes less than 10% of the total volume of the tape and preferably less than 5% of the total volume. In an embodiment, the binder component constitutes less than 10% of the total mass of the tape and preferably less than 5% of the total mass. The fibers of the tape can be any fibers that are used as reinforcing fibers, such as carbon fiber, aramid fiber, glass fiber, or a combination of two or more types of fibers.

As the tape-laying head moves and lays the tape, an impregnation subsystem impregnates the tape with a mixture of multi-component epoxy thereby creating a multi-component layer consisting of the fibers of the tape and the epoxy impregnated into the tape. A two-component epoxy consisting of a resin component and a hardener component is used as an example but also other multi-component matrices can be used, such as three-part methyl methacrylate adhesive system or a two-component epoxy with an accelerator component.

The impregnation subsystem comprises two or more containers for epoxy components, at least one container for each epoxy component. The components are pumped from said containers with pumps into a mixing unit. Preferably the number of pumps is equal to the number of containers or equal to the number of epoxy components. For example, a system using two-component epoxy, resin and hardener, can have total of two containers, one container for the resin component and one container for the hardener component and two pumps, one for each container. The components are preferably moved through tubing with the use of a metering pump (e.g. piston pump, peristaltic pump or screw pump). The pumps are configured to pump the two or more components into a mixing unit which is preferably a static mixer 5. Mixing ratio of the epoxy components varies between component combinations and the pumps are configured to pump the components from the containers to the mixing unit according to the mixing ratio of said components. Pumping of the epoxy components in desired ratio to the static mixer 5 moves the epoxy components through the mixer and at the same time mixes the components thoroughly.

The mixed epoxy coming out from the mixer 5 can be applied on the tape that has been laid and rolled against the mould. Typically multi-component epoxies have such a high viscosity that proper impregnation of the tape doesn't take place without assistance. Therefore the impregnation subsystem comprises a spreader or a spreader system which can have one or more functions. In an embodiment the mixed multi-component epoxy coming out from the mixer 5 flows through a wide spreading mechanism which spreads the epoxy and forms a layer of epoxy onto the tape covering most of the tape width, for example more than 50%, more than 70% or more than 90% of the tape width. In another embodiment, the epoxy is applied directly from the static mixer on the tape. Once the epoxy has been applied on the tape, either directly or through a spreading mechanism, the epoxy is pressed into the tape in order to fully impregnate the tape and to remove any air bubbles. The pressing can be realized with a roller or flap 6 or a similar device which exerts a force on the epoxy towards the tape.

At the end of each pass, the fiber tape is cut using a cutter of a tape cutting sub-system. Preferably a laser 4 is used where a laser beam, either converted into a stationary line, perpendicular to the fiber direction, or with a focused beam moving perpendicular to the fiber direction cuts the tape. With a stationary laser cutter, a uniform-power distribution line generating lens or lens system can be used for converting the focused laser point into a line matching or exceeding the tape width. Preferably the width of this laser line is adjustable to match different tape widths. The adjustment can be realized e.g. by changing the distance between the lens and the laser source.

A first aspect of the invention is a method of manufacturing fiber reinforced plastic parts. The method comprises using a tape rolling system to perform steps of placing a segment of a tape on a mould by moving a tape-laying head of the tape rolling system in planar motion; mixing a mixture of resin and hardener; impregnating the tape with the mixture of resin and hardener; distributing and compressing the mixture of resin and hardener within the tape using a spreading mechanism of the tape rolling system; cutting the tape with a laser cutter of the tape rolling system; and moving the tape laying head of the tape rolling system one tape width to a direction perpendicular to said planar motion and repeating the process again for multiple layers of different fiber orientation.

In an embodiment of the first aspect of the invention, said laser cutter is a stationary laser comprising a lens generating a uniform power distribution line. In an embodiment of the first aspect of the invention, said laser cutter is a moving laser unit.

In an embodiment of the first aspect of the invention, said tape is a carbon fiber tape.

In an embodiment of the first aspect of the invention, said cutting step is performed on a dry carbon fiber tape.

In an embodiment of the first aspect of the invention, said mixing step and said impregnating step are performed in-situ.

In an embodiment of the first aspect of the invention, the method further comprises a step of rotating the mould in relation to the tape laying head between layers of tape for altering fiber orientation between layers.

A second aspect of the invention is a tape-laying system for manufacturing fiber reinforced plastic parts. The system comprises a tape rolling sub-system comprising a movable tape-laying head having a rotatable roller for tensioning and placing a tape; a tape impregnation subsystem comprising means for mixing resin and hardener with each other and a spreader for impregnating the tape with said mixture; and a cutting sub-system comprising a laser cutter configured to cut the tape with a laser beam.

In an embodiment of the second aspect of the invention, said cutting sub-system comprises a lens configured to convert said laser beam into a stationary line perpendicular to the fiber direction.

In an embodiment of the second aspect of the invention, said cutting subsystem is configured to cut the tape using a focused beam moving perpendicular to a direction of fibers in the tape.

A third aspect of the invention is a method of manufacturing fiber reinforced plastic parts. The method comprises using a tape rolling system to perform steps of: placing a segment of a tape on a mould by moving a tape-laying head of the tape rolling system; providing components of a multi-component epoxy in defined ratios to a mixer; mixing a mixture of multi-component epoxy with the mixer; spreading the mixture of multi-component epoxy on the placed segment of the tape; impregnating the mixture of multi-component epoxy into the tape; cutting the tape with a cutter of the tape rolling system; and moving the tape-laying head of the tape rolling system one tape width to a direction perpendicular to fiber direction of the placed tape segment.

In an embodiment of the third aspect of the invention, said cutter is a stationary laser cutter comprising a laser source and a lens generating a uniform power distribution line.

In an embodiment of the third aspect of the invention, said cutter is a moving laser unit comprising a laser source.

In an embodiment of the third aspect of the invention, said tape is a spread tow of fibers, wherein the fibers are selected from the following fibers: carbon fiber, aramid fiber and glass fiber.

In an embodiment of the third aspect of the invention, said cutting step is performed on a dry portion of the tape.

In an embodiment of the third aspect of the invention, said mixing step and said impregnating step are performed in-situ.

In an embodiment of the third aspect of the invention, the method further comprises a step of rotating the mould in relation to the tape laying head between layers of tape for altering fiber orientation between layers.

A fourth aspect of the invention is a tape-laying system for manufacturing fiber reinforced plastic parts. The system comprises a tape rolling sub-system comprising a movable tape-laying head having one or more rotatable rollers 1, 2 for tensioning and placing a tape; a tape impregnation subsystem comprising a container for each component of a multi-component epoxy, a plurality of pumps for pumping said components to a mixer 5 for mixing components of a multi-component epoxy with each other, and a spreader 6 for impregnating the tape with said mixture; and a cutting sub-system comprising a cutter 4 configured to cut the tape.

In an embodiment of the fourth aspect of the invention, said cutting sub-system is a laser cutter 4 comprising a laser source and a lens configured to convert a laser beam from the laser source into a stationary line perpendicular to a fiber direction of the tape.

In an embodiment of the fourth aspect of the invention, said cutting sub-system is a laser cutter 4 comprising a laser source configured to cut the tape using a focused beam moving perpendicular to a direction of fibers in the tape.

In an embodiment of the fourth aspect of the invention, said cutting sub-system 4 is located between said tape rolling subsystem and said tape impregnation subsystem for cutting a dry, non-impregnated, tape.

The system enables manufacturing of small fiber reinforced parts without human intervention. Thus, consistent quality can be achieved and manufacturing costs can be reduced. In addition, the system avoids human exposure to carcinogenic material (epoxy resins are typically used) while manufacturing FRP parts thus reducing the health hazard to the laborer. The system provides manufacturing freedom as of additive manufacturing with strength of FRP composites, allowing manufacturing of high strength quality parts with ease.

REFERENCES

1. Mills, A., Automation of carbon fibre preform manufacture for affordable aerospace applications. Composites Part A: Applied Science and Manufacturing, 2001. 32(7): p. 955-962.

2. Wisbey, J. D., Multi-tow fiber placement machine with full band width clamp, cut, and restart capability. 1990, Google patents.
3. M, V. M., U.S. Pat. No. 5,110,395. 2016.
4. Prüß, H. and T. Vietor, Design for fiber-reinforced additive manufacturing. Journal of Mechanical Design, 2015. 137(11): p. 111409.
5. COMBINING ADDITIVE MANUFACTURING WITH FRP COMPOSITES: DESIGN POTENTIALS. 2016.
6. Composite Materials—Science and Engineering|Krishan K. Chawla|Springer. 2016.

The invention claimed is:

1. A method performed by a tape-laying system, the method comprising:
    pressing a segment of a tape onto a mold using a roller;
    applying an epoxy on the segment of the tape using a mixer after pressing the segment of the tape onto the mold using the roller;
    impregnating the epoxy into the segment of the tape; and
    cutting the tape at a position that is between the mixer and the roller.

2. The method of claim 1, wherein cutting the tape comprises cutting the tape using a laser.

3. The method of claim 1, wherein said tape is a spread tow of fibers, selected from one or more of carbon fiber, aramid fiber, or glass fiber.

4. The method of claim 1, further comprising mixing a first component and a second component to form the epoxy, wherein the mixing and the impregnating are performed in-situ.

5. The method of claim 1, further comprising:
    rotating the mold after impregnating the epoxy into the segment of the tape; and
    pressing a segment of a second tape onto the mold after rotating the mold.

6. The method of claim 1, further comprising:
    moving a tape-laying head of the tape-laying system in a first direction along the mold while pressing the segment of the tape, applying the epoxy, and impregnating the epoxy; and
    moving the tape-laying head in a second direction along the mold that is perpendicular to the first direction after impregnating the epoxy into the segment of the tape.

7. A tape-laying system comprising:
    a roller configured for pressing a segment of a tape onto a mold;
    a mixer configured for applying an epoxy on the segment of the tape after pressing the segment of the tape onto the mold using the roller; and
    a spreader configured for impregnating the epoxy into the segment of the tape; and
    a cutter configured to cut the tape at a position that is between the mixer and the roller.

8. The tape-laying system of claim 7, wherein the tape-laying system is configured to apply the tape to the mold along a first direction, and wherein the cutter comprises a laser configured to cut the tape perpendicularly to the first direction.

9. The tape-laying system of claim 7, wherein said cutter is located between said roller and said spreader.

10. The tape-laying system of claim 7, wherein the mixer is between the spreader and the cutter.

* * * * *